(12) United States Patent
Schauer

(10) Patent No.: US 7,204,243 B2
(45) Date of Patent: Apr. 17, 2007

(54) TRUING TOOL FOR TRUING A GRINDING WORM

(75) Inventor: Engelbert Schauer, Unterschleissheim (DE)

(73) Assignee: The Gleason Works, Rochester, NY (US)

( * ) Notice: Subject to any disclaimer, the term of this patent is extended or adjusted under 35 U.S.C. 154(b) by 156 days.

(21) Appl. No.: 10/828,702

(22) Filed: Apr. 21, 2004

(65) Prior Publication Data

US 2004/0235401 A1 Nov. 25, 2004

(30) Foreign Application Priority Data

May 16, 2003 (DE) ................. 103 22 181

(51) Int. Cl.
*B24B 53/053* (2006.01)
(52) U.S. Cl. .................... 125/11.03; 451/443
(58) Field of Classification Search ............ 125/11.03; 451/56, 443
See application file for complete search history.

(56) References Cited

U.S. PATENT DOCUMENTS

| 1,823,734 A | * | 9/1931 | Garrison | ............ 451/137 |
| 2,824,556 A | * | 2/1958 | Bateman | ............ 125/11.03 |
| 3,077,877 A | * | 2/1963 | Daniel et al. | ............ 125/11.03 |
| 4,502,456 A | * | 3/1985 | Janutta et al. | ............ 125/11.03 |
| 5,857,896 A | * | 1/1999 | Stollberg | ............ 451/47 |
| 6,234,880 B1 | * | 5/2001 | Scacchi | ............ 451/47 |
| 6,290,574 B1 | * | 9/2001 | Thyssen | ............ 451/9 |
| 6,379,217 B1 | * | 4/2002 | Thyssen | ............ 451/5 |
| 2003/0027507 A1 | * | 2/2003 | Stollberg | ............ 451/72 |
| 2004/0005843 A1 | | 1/2004 | Breitschaft et al. | |

FOREIGN PATENT DOCUMENTS

| DE | 3401341 | 10/1984 |
| DE | 19625520 | 6/1997 |
| DE | 19910746 | 9/2000 |

OTHER PUBLICATIONS

English translation of Abstract from German Patent Application DE 34 01 341.
English translation of Official Action from German Patent Office in corresponding German Patent Application No. DE 103 22 181.6.
Search Report from European Patent Office in corresponding European Patent Application No. 04 005 781.2.

* cited by examiner

*Primary Examiner*—M. Rachuba
(74) *Attorney, Agent, or Firm*—Robert L. McDowell

(57) ABSTRACT

A truing tool for truing an essentially cylindrical grinding worm that is arranged on the tool spindle of a machine suitable for the continuous generation grinding in the tangential- and diagonal process. The truing tool comprises an essentially cylindrical gear wheel (6) having an abrasive coating on the surface that is active during truing to profile the flanks of the grinding worm (3) and an essentially cylindrical roll (7) having an abrasive coating on its circumferential surface to adapt the diameter of the addendum circle of the grinding worm. The gear wheel (6) and the roll (7) can be connected axially and torsion-resistantly to the work piece spindle (1) of the machine.

3 Claims, 1 Drawing Sheet

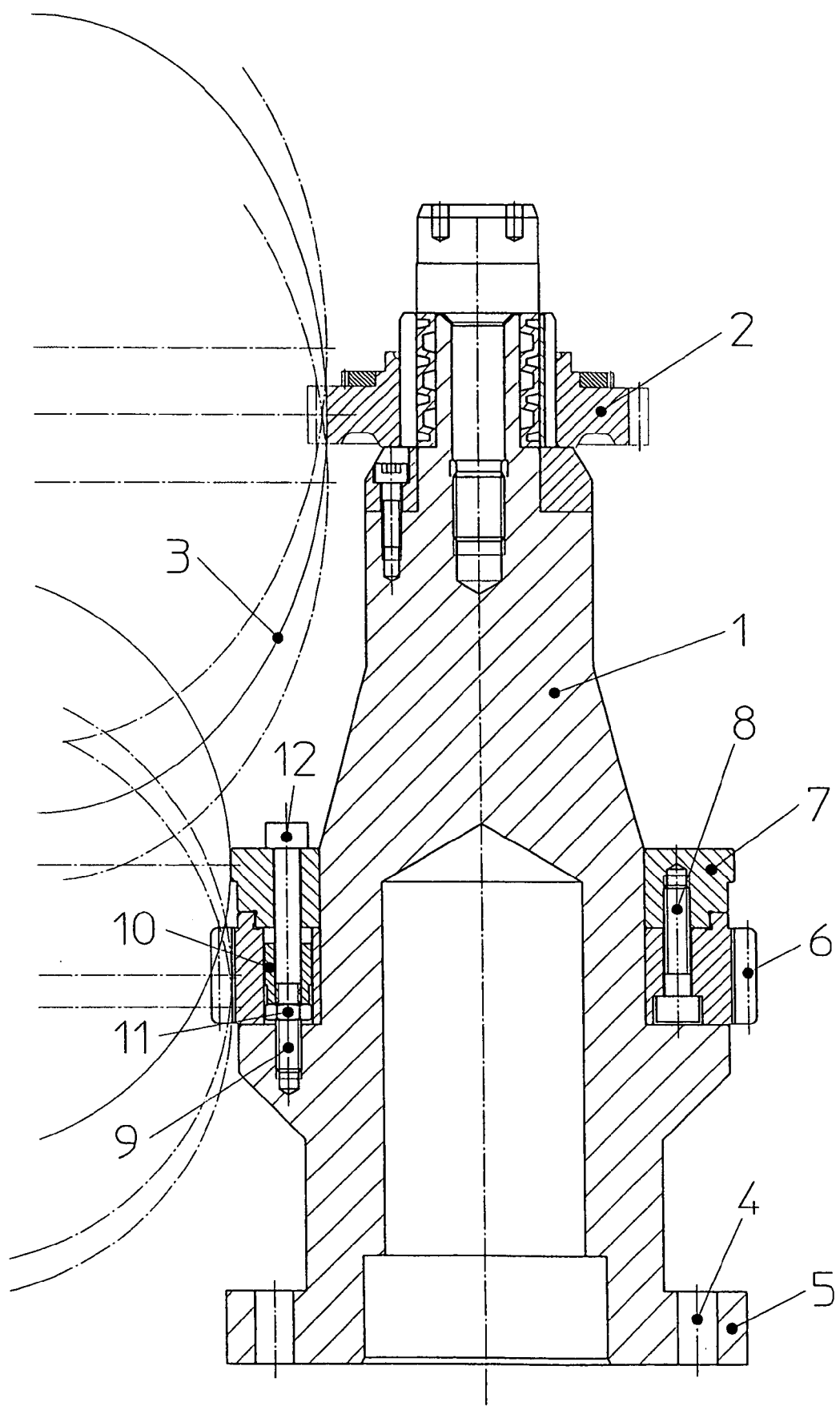

TRUING TOOL FOR TRUING A GRINDING WORM

FIELD OF THE INVENTION

The invention relates to a truing tool for truing an essentially cylindrical grinding worm that is arranged on a tool spindle of a machine suitable for the continuous generation grinding in the tangential or diagonal process.

BACKGROUND OF THE INVENTION

Cylindrical grinding worms are used for the continuous generation grinding of gear wheels. Because the grinding worm is subject to natural wear and tear during this process, it must be trued from time to time. In the truing process, material is machined off the flanks or the treads of the grinding worm so that the head area of the thread(s) is getting narrower. Therefore, in addition to the tool for the profiling of the grinding worm, a tool is also required to adapt the diameter of the addendum circle of the grinding worm. The diameter of the addendum circle is decreased such that the head area of the thread(s) of the grinding worm again has the originally provided width.

Thus, the means for truing the grinding worm therefore comprises two separate tools. The tool for the profiling of the flanks of the grinding worm, for example, can be a profile-grinding wheel. With two such tools, the truing of the grinding worm is generally not effected at the place on the machine where the workpiece, i.e. the gear wheel, will be machined later on. However, for reasons of precision, it is desired that the truing process occur at the location where the grinding worm later machines the workpieces.

It has been proposed in U.S. Patent Application Publication No. 2004/0005843 (corresponding to German Patent Application Publication No. 102 20 513) to use an essentially cylindrical gear wheel to profile the flanks of the grinding worm. The profiling gear has an abrasive coating on the surface that is active during truing and the gear is taken up on the work piece spindle of the machine in place of the work piece. Because the only function of said gear is to profile the flanks of the grinding worm, an additional means to adapt the diameter of the addendum circle of the grinding worm is required.

The invention is based on the problem to develop the generic truing tool such so as to simplify the loading concept and shorten the duration of the machining of the grinding worm.

SUMMARY OF THE INVENTION

In accordance with the invention, this problem is solved with a truing tool that is characterized by an essentially cylindrical gear wheel having an abrasive coating on the surface that is active during truing to profile the flanks of the grinding worm, and an essentially cylindrical roll having an abrasive coating on the circumferential surface to adapt the diameter of the addendum circle of the grinding worm, with the gear wheel and the roll being axial- and torsion-resistantly connectable to the work piece spindle of the machine.

BRIEF DESCRIPTION OF THE DRAWING

The sole FIGURE of the illustration shows in longitudinal section a work piece spindle of a machine for the continuous generation grinding of gear wheels in the tangential or diagonal process.

DETAILED DESCRIPTION OF THE PREFERRED EMBODIMENT

The invention will now be explained in the following greater detail by means of the embodiment illustrated by the drawing.

The fact that both components of the truing tool can be accommodated on the work piece spindle simplifies the loading concept. Additional time is saved in that the truing of the flanks of the grinding worm and the adaptation of the diameter of the addendum circle of the same can be effected in one work cycle.

The gear wheel and the roll can be developed such that they can be connected axial- and torsion-resistantly to the work piece spindle independent of one another. For various reasons, however, it is more advantageous that the gear wheel and the roll are connected to one another with torsion strength and that they can be connected to the work piece spindle axially and torsion-resistantly as a tool unit. For this purpose, the gear wheel and the roll could be developed in one piece. In this case, however, the entire tool must be replaced if the gear wheel is worn out, even though the roll has a significantly longer service life than the gear wheel.

Developing the gear wheel and the roll as a one- or two-component tool unit enables a standardization of the truing tool in an advantageous manner. To true various grinding worms, a set of truing tools with uniform interior diameter, which are different only with respect to the outer diameter and the gear geometry, the module, the angle of engagement and the helix angle of the gear wheel, are sufficient.

A gearwheel 2 is clamped on the upper free end of the work piece spindle 1 in the illustration. The gear wheel is being precision-machined with a cylindrical grinding worm 3 indicated by an elliptical outline. The grinding worm 3 is arranged torsion-resistantly on a tool spindle (not shown). Because the construction of a machine used for the continuous generation grinding is principally known, a detailed explanation of the machine is not necessary.

The free end area of the work piece spindle 1 turns into a cylindrical area with an enlarged diameter via a conical area, with a ring shoulder connecting to said cylindrical area with enlarged diameter. On the other end, the work piece spindle 1 has a ring flange 5 with borings 4 to attach on a drive shaft of the machine. A truing tool to true the grinding worm 3 is comprised of an essentially cylindrical truing gear wheel 6 (simply referred to as "gear wheel" in the following) and of an essentially cylindrical truing roll 7 (simply referred to as "roll" in the following) which are combined into one tool unit in the manner described below.

The gear wheel 6 has an abrasive coating on its surface that is active during truing, i.e., in the area of the tooth flanks. In the same way, the roll 7 also has an abrasive coating on the circumferential surface. The gear wheel 6 and the truing roll 7 have the same interior diameter, which is slightly larger than the outer diameter of the cylindrical area of the work piece spindle 1. The gear wheel 6 and the roll 7 have corresponding annular projections and/or recesses for reciprocal centering.

As shown on the left side of the illustration, the gear wheel 6 and the roll 7 have a plurality, preferably three, aligned borings, with the borings developed in the gear wheel having a larger diameter, for reasons explained below. Corresponding tapped holes 9 are arranged in the ring shoulder of the work piece spindle 1.

In the assembly of the truing tool, a locking screw 12 is first inserted into the borings of the gear wheel 6, and then a threaded bushing 10 is screwed onto the locking screw and countered with a nut 11.

As shown in the right half of the illustration, the gearwheel 6 has a plurality, preferably three, staggered borings across the circumference. The roll 7 has corresponding tapped holes so that the gear wheel 6 and the roll 7 can be connected torsion-resistantly with the screws 8. This tool unit, which is formed by the gear wheel 6 and the roll 7, is arranged on the cylindrical area of the work piece spindle 1. The locking screws 12 are then screwed into the corresponding tapped holes 9 of the work piece spindle 1 so that the gear wheel 6 abuts the ring shoulder of the work piece spindle. The segment of the cylindrical area of the work piece spindle 1 that borders the ring shoulder has a slightly enlarged outer diameter, which results in a press fit with the gear wheel 6. The tool unit comprised of the gear wheel 6 and the roll 7 is therefore axial- and torsion-resistantly connected to the work piece spindle 1 in concentric arrangement.

If the grinding worm 3 has to be trued because of wear and tear, the tool spindle and the work piece spindle 1 are moved relative toward one another to engage the grinding worm 3 and the gear wheel 6 under a suitable angle. The flanks of the grinding worm 3 are then profiled in a tangential- or diagonal process. In doing so, only the technological variables such as infeed, feed and rotational speed of the grinding worm 3 must be coordinated with the specific truing task. All movements required for the truing of the grinding worm in the tangential- or diagonal process can be executed by the already available machine axles.

After the flanks of the grinding worm 3 and the gear wheel 6 have been profiled, there is a relative movement of the work piece spindle 1 and the tool spindle to arrange the grinding worm 3 opposite the roll 7. More specifically, the grinding worm 3 is brought into engagement with the abrasive circumferential surface of the roll 7 to adapt the diameter of the addendum circle. The profiling of the flanks of the grinding worm and the required adaptation of the diameter of the addendum circle are then performed in one work cycle.

With a standardized set of truing tools comprised of gear wheel 6 and roll 7 having a uniform interior diameter, it is possible to true grinding worms 3 with various profiles.

If the gear wheel 6 has to be replaced because of wear and tear, the locking screws 12 are screwed out of the threaded borings 9 of the work piece spindle 1. As a result, the threaded bushing 10, which is connected with torsion resistance to the locking screw 12 by the nut 11, abuts the roll 7. If the locking screw 12 is screwed further out of the threaded boring 9, an axial force is exerted on the roll 7, which is transmitted to the gear wheel 6 through the screws 8. Under said axial force, the gear wheel 6 is pushed off by the work piece spindle 1. As soon as the gear wheel 6 has been displaced sufficiently far away axially relative to the work piece spindle 1 so that the press fit turns into a sliding fit, the tool unit comprised of the gear wheel 6 and the roll 7 can be pulled off by the work piece spindle 1.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. Truing tool for truing an essentially cylindrical grinding worm that is arranged on a tool spindle of a machine for continuous generation grinding in the tangential- and diagonal process, said truing tool comprising:
    an essentially cylindrical gear wheel having an abrasive coating on the surface that is active during truing to profile the flanks of the grinding worm;
    an essentially cylindrical roll having an abrasive coating on its circumferential surface to adapt the diameter of the addendum circle of the grinding worm;
    the gear wheel and the roll being axial-resistantly and torsion-resistantly connected to a workpiece spindle of the machine.

2. The truing tool of claim 1 wherein the gear wheel and the roll are torsion-resistantly connected to one another and are connectable axial-resistantly and torsion-resistantly with the work piece spindle as a tool unit.

3. The truing tool of claim 1 wherein the gear wheel and the roll are a one piece unit.

\* \* \* \* \*